United States Patent
Hesse et al.

(10) Patent No.: US 9,432,096 B2
(45) Date of Patent: Aug. 30, 2016

(54) DUAL CODEWORD RE-TRANSMISSION

(75) Inventors: Matthias Hesse, Drebach (PL); Karri Markus Ranta-Aho, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/418,551

(22) PCT Filed: Aug. 2, 2012

(86) PCT No.: PCT/EP2012/065199
§ 371 (c)(1),
(2), (4) Date: Apr. 16, 2015

(87) PCT Pub. No.: WO2014/019628
PCT Pub. Date: Feb. 6, 2014

(65) Prior Publication Data
US 2015/0229366 A1    Aug. 13, 2015

(51) Int. Cl.
| | |
|---|---|
| *H04B 7/04* | (2006.01) |
| *H04L 1/18* | (2006.01) |
| *H04B 7/06* | (2006.01) |
| *H04L 5/00* | (2006.01) |
| *H04L 1/16* | (2006.01) |
| *H04W 88/02* | (2009.01) |
| *H04W 88/08* | (2009.01) |

(52) U.S. Cl.
CPC .......... *H04B 7/0413* (2013.01); *H04B 7/0639* (2013.01); *H04L 1/1812* (2013.01); *H04L 1/1896* (2013.01); *H04L 5/0055* (2013.01); *H04L 1/1607* (2013.01); *H04L 1/189* (2013.01); *H04W 88/02* (2013.01); *H04W 88/08* (2013.01)

(58) Field of Classification Search
USPC ......... 375/267, 285, 296; 370/208, 336, 335
See application file for complete search history.

(56) References Cited

U.S. PATENT DOCUMENTS

| | | | |
|---|---|---|---|
| 7,292,636 B2 * | 11/2007 | Haskell et al. | 375/240.23 |
| 8,498,195 B1 * | 7/2013 | Lee et al. | 370/208 |

(Continued)

FOREIGN PATENT DOCUMENTS

| | | |
|---|---|---|
| EP | 2 234 308 A1 | 9/2010 |
| WO | WO 2009/042290 A1 | 4/2009 |

OTHER PUBLICATIONS

3GPP TSG-RAN WG1 #69, Prague, Czech Republic, May 21-25, 2012, RI-122814, "Retransmission Operations in a 2 Codeword MIMO System", Ericsson, 8 pgs.
3GPP TS 25.212 V11.2.0 (Jun. 2012), "$3^{rd}$ Generation Partnership Project; Technical Specification Group Radio Access Network; Multiplexing and channel coding (FDD) (Release 11)", 130 pgs.

(Continued)

*Primary Examiner* — Eva Puente
(74) *Attorney, Agent, or Firm* — Harrington & Smith

(57) ABSTRACT

The present invention addresses apparatuses, methods and computer program product for providing enhanced codeword re-transmission for multi-codeword in 4 antenna branch HSDPA MEMO wireless communication network, thereby preventing getting stuck in higher than rank 1transmissions. When a negative acknowledgement signaling is received from a terminal upon transmission including a first and a second codeword to the terminal, the codeword not associated with the negative acknowledgement signaling is replaced with a temporary codeword, and a transmission a re-transmission of the codeword associated with the negative acknowledgement signaling and the temporary codeword to the base station is caused.

11 Claims, 5 Drawing Sheets

* A codeword contains two transport blocks and is interleaved across two layers

(56) References Cited

U.S. PATENT DOCUMENTS

| | | | |
|---|---|---|---|
| 2009/0245212 A1* | 10/2009 | Sambhwani et al. | 370/336 |
| 2009/0296798 A1* | 12/2009 | Banna et al. | 375/229 |
| 2010/0037112 A1* | 2/2010 | Graumann | 714/748 |
| 2010/0115358 A1 | 5/2010 | Kotecha et al. | 714/748 |
| 2011/0200016 A1* | 8/2011 | Bergman et al. | 370/335 |

OTHER PUBLICATIONS

"Draft Report of 3GPP TSG RAN WG1 #69 v0.2.0 (Prague, Czech Republic, May 21-25, 2012)"; R1-12xxxx; 3GPP TSG RAN WG1 Meeting #70; Qingdao, People's Republic of China; Aug. 13-17, 2012; 121 pages; 3rd Generation Partnership Project (3GPP); Mobile Competence Centre; 650, Route des Lucioles; F-06921 Sophia-Antipolis Cedex; France.

* cited by examiner

US 9,432,096 B2

DUAL CODEWORD RE-TRANSMISSION

FIELD OF THE INVENTION

The present invention generally relates to wireless communication, and more specifically relates to codeword re-transmission after a multi-codeword transmission in 4-transmit antenna high speed downlink packet access (HSDPA) MIMO, thereby preventing getting stuck in a higher-than-desired rank multi-codeword transmissions for 4-transmit antenna multiple-input-multiple-output (MIMO) HSDPA.

BACKGROUND

Mobile data transmission and data services are constantly making progress. With the increasing penetration of such services, such as mobile broadband usage and possibilities for competitive offerings to customers, a need for increased capacity for conveying the data is emerging. Thus, techniques which allow mobile operators to manage their spectrum resources efficiently are of high importance.

Therefore, in order to support uplink data rates, mobile operators may provide their base stations with additional receiving antennas. Base stations equipped with multiple receiving antennas may improve the downlink performance by introducing support for four antenna branch MIMO transmission. In addition to doubling the peak data rate when compared to two antenna branch MIMO transmission, the possibility of transmitting from four antennas will also increase the coverage for rank-1 and rank-2 transmissions. Therefore, 4-branch MIMO transmission schemes are well applicable for increasing the cell and cell-edge user data rates.

Prior art which is related to this technical field can e.g. be found in technical specifications according to 3GPP Release 11, in particular, the Draft Report of 3GPP TSG RAN WG1 #69 v0.2.0.

According to the above mentioned specification, it has been agreed that in case of re-transmissions, relative to the initial transmission of a codeword:
  Number of layers (and transport blocks TB) per codeword CW shall be maintained
  Order of codewords CW shall be maintained
  Special mappings for re-transmissions are not considered further This allows for a straight forward extension of the standard to 4Tx MIMO. However, in some particular cases the agreements above can cause suboptimal behavior.

That is, currently, 4-branch MIMO is standardized in 3GPP within Rel 11, wherein in previous 3GPP meetings, the usage of so called codewords CW was decided. A codeword is the combination of up to two transport blocks. The number of transport blocks in one codeword depends on the rank. Only one acknowledgement/negative acknowledgement Ack/Nack is signaled per codeword, i.e. if one transport block in the codeword is not successfully transmitted, the whole codeword has to be retransmitted. That also implies that a CW with two transport blocks can only be retransmitted in the same format (CW with two transport blocks), and codewords with one transport block can only be retransmitted in a 1-transport block per CW format.

The problem is the rank reduction in case of re-transmissions. From the description above, it can be concluded that if a CW with two transport blocks fails, it can be retransmitted with rank 3 or 4 but not with rank 1 or 2. A codeword with two transport blocks can't be simply mapped to two codewords with one transport block each.

Another problem is that each hybrid automatic repeat request HARQ has an identification ID. Retransmitting for example CW 1 from a rank 4 transmission as CW 2 in rank 3 would require the definition of a special mapping of the HARQ ID.

This is technically feasible but would require undesired exceptions in the standard. The conclusion is that rank reduction for re-transmission is complicated and standard will not introduce explicit mechanisms for supporting it.

The current opinion in 3GPP for those re-transmissions is that re-transmissions should keep the rank. If this rank is too optimistic and the re-transmissions are not successful, the base station NB would simply terminate the HARQ process and start the transmission of the affected transport blocks from scratch.

However, for some cases, this configuration may suffer from problems. That is, as an example, assuming the user equipment UE gets a rank 4 transmission (two CWs, each carrying two transport blocks), one CW succeed and is acknowledged, and the other one CW fails and gets a negative acknowledgement Nack requesting for a re-transmission. As the rank needs to be maintained for re-transmissions, the CW to be retransmitted needs to be accompanied with another CW delivering new data. By the time the re-transmission is to take place the channel may have gotten worse (UE is moving away from NB, or rank 4 was scheduled during an exceptional good transmission time interval TTI) and it is quite likely that the CW with new data also fails (only one of the two contained transport blocks has to fail). The NB could now terminate the 1 HARQ process after the maximal number of re-transmissions is reached for this CW. However, the second CW would still require re-transmissions. And two new transport blocks would be scheduled for the first CW. Since the channel conditions are not adequate for rank 4, the new CW 1 would also fail. In this manner, the UE can be stuck in rank 4 re-transmissions.

Another problematic case is when the NB transmit buffer is empty, it has CW to be retransmitted with high rank, but no new data to transmit, and hence it is not able to accompany the CW to be retransmitted with another CW carrying new data, preventing the re-transmission to take place at the same rank it was initially transmitted.

SUMMARY OF THE INVENTION

Therefore, it is an object underlying the present invention to provide an enhanced codeword re-transmission which solves the above drawbacks of the prior art. In particular, it is an object of the present invention to provide an apparatus, a method and a computer program product for providing enhanced codeword re-transmission for 4 transmit antenna HSDPA MIMO wireless communication network, thereby preventing getting stuck in a high-rank two-codeword transmissions.

According to a first aspect of the present invention, there is provided an apparatus, which comprises reception means adapted to receive a negative acknowledgement signaling from a terminal upon transmission comprising a first and a second codeword to the terminal, processing means adapted to provide a temporary codeword for the codeword not associated with the negative acknowledgement signaling, and transmission means adapted to cause transmission comprising a re-transmission of the codeword associated with the negative acknowledgement signaling and the temporary codeword.

According to a second aspect of the present invention, there is provided a method, comprising receiving a negative acknowledgement signaling from a terminal upon transmission comprising a first and a second codeword to the terminal, providing a temporary codeword for the codeword not associated with the negative acknowledgement signaling, and causing transmission comprising a re-transmission of the codeword associated with the negative acknowledgement signaling and the temporary codeword.

According to a third aspect of the present invention, there is provided an apparatus, comprising determination means adapted to determine successful reception of codewords comprising a first and a second codeword from a base station, transmission means adapted to cause a transmission of a negative acknowledgement signaling in case of a negative determination to the base station, and reception means adapted to receive transmission of comprising a re-transmission of the codeword associated with the negative acknowledgement signaling and a temporary codeword from the base station.

According to a fourth aspect of the present invention, there is provided a method, comprising determining successful reception of a transmission comprising a first and a second codeword from a base station, causing a transmission of a negative acknowledgement signaling in case of a negative determination to the base station, and receiving transmission comprising a re-transmission of the codeword associated with the negative acknowledgement signaling and a temporary codeword from the base station.

According to a fifth aspect of the present invention, there is provided a computer program product comprising computer-executable components which, when the program is run on a computer, are configured to carry out the method according to at least one of the second and the method according to the fourth aspect.

According to another embodiment of the invention, the temporary codeword is an empty codeword.

In another embodiment, the temporary codeword is a duplicate of the codeword associated with the negative acknowledgement signaling.

According to certain embodiments of the invention, signaling for the usage of the temporary codeword is carried out via transport format resource indicator transmitted over highspeed shared control channel.

Furthermore, the modulation indicator of a code word may be set to a predetermined value and/or the transport format resource indicator of a codeword may be set to a predetermined value in order to indicate a temporary codeword.

Still further, information indicating a transmitted codeword being an initial transmission or re-transmission may be set to a predetermined value in order to indicate that the transmitted codeword is a temporary codeword.

According to certain embodiments of the invention, each apparatus may comprise at least one processor, and at least one memory including computer program code, the at least one memory and the computer program code configured to, with the at least one processor, cause to carry out the method according to at least one of the first aspect and the method according to the third aspect.

Advantageous further developments or modifications of the aforementioned exemplary aspects of the present invention are set out in the dependent claims.

BRIEF DESCRIPTION OF DRAWINGS

For a more complete understanding of example embodiments of the present invention, reference is now made to the following descriptions taken in connection with the accompanying drawings in which.

DESCRIPTION OF EXEMPLARY EMBODIMENTS

Exemplary aspects of the present invention will be described herein below. More specifically, exemplary aspects of the present are described hereinafter with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a UMTS/HSDPA communication system is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

As already indicated above, a codeword is the combination of up to two transport blocks, wherein the number of transport block in one codeword depends on the rank. If one transport block in the codeword is not successfully transmitted, the whole codeword has to be retransmitted, wherein a CW with 2 transport block can only be retransmitted in the same format, i.e. a CW with 2 transport blocks, and codewords with one transport block can only be retransmitted in a 1 transport block per CW format.

Figure 1:
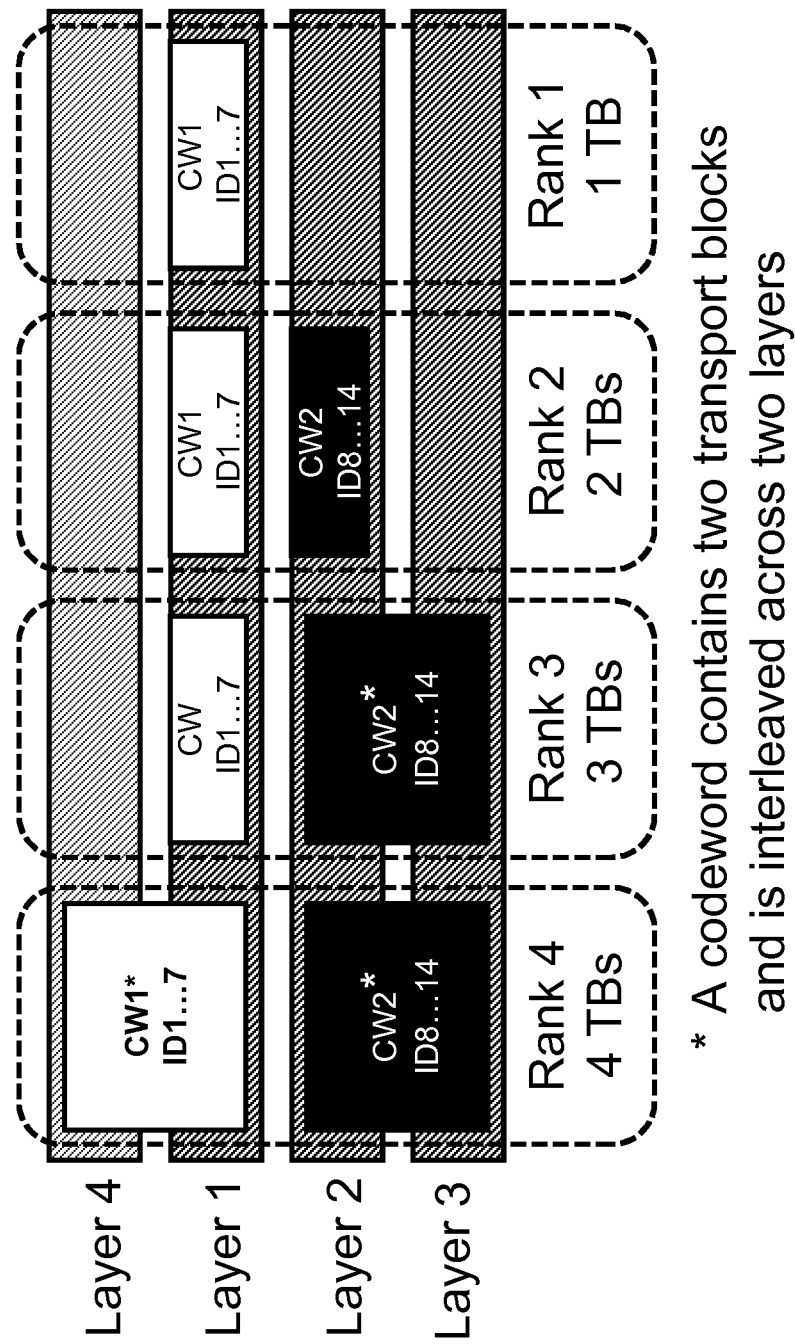
FIG. 1 schematically illustrates a Transport block TB to Codeword CW to layer mapping.

FIG. 1 schematically illustrates a Transport block TB to Codeword CW to layer mapping according to certain embodiments of the present invention. In particular, FIG. 1 shows the CW size for each rank. The large boxes contain 2 transport blocks and the small boxes only one, i.e. rank 3 transmission has 1 CW with 1 transport block and one with 2 transport blocks. In rank 4 transmissions, both CWs contain two transport blocks. Furthermore, each hybrid automatic repeat request HARQ has an assigned ID.

If a CW with two transport blocks fails, it can be retransmitted with rank 3 or 4 but not with rank 1 or 2. A codeword with two transport blocks can't be simply mapped to 2 codewords with one transport block each. Furthermore, re-transmission of for example CW 1 from a rank 4 transmission as CW 2 in rank 3 would require the definition of a special mapping of the HARQ ID.

In order to avoid getting stuck e.g. in rank 4 transmission, a mechanism to avoid interrupt the re-transmission chain is required.

According to certain embodiments of the present invention, an option is provided to transmit an empty codeword without which performing an associated hybrid automatic repeat request HARQ process can be used.

Hence, according to certain embodiments, in case the NB detects the case described above, it would have the possibility to keep the rank, but sent an empty codeword for the correctly received CW and then use all the power on the CW associated with the re-transmission. After a successful re-transmission or when the maximum number of re-transmissions is reached, the rank can be lowered as there are no pending re-transmissions forcing the NB to keep the rank.

The signaling for the usage of such an empty codeword could, as an example, be done via Transport Format Resource Indicator TFRI which is transmitted over the high speed shared control channel HS-SCCH. According to certain embodiments, an a-priori defined (standardized) combination of transport format of CW1 and CW2 may indicate the empty codeword.

Optionally, according to certain embodiments of the present invention, the second codeword may also be a duplicate of the first codeword, and hence may provide additional coding gain.

Figure 2:
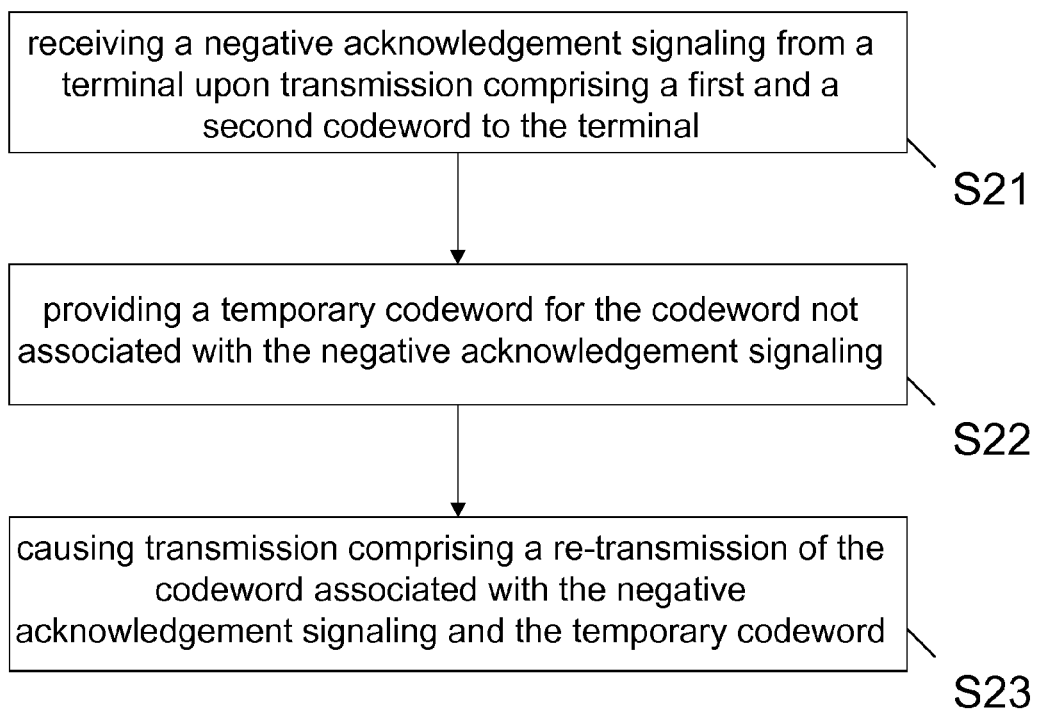
FIG. 2 shows a principle flowchart of an example for a method according to certain embodiments of the present invention, which may be implemented in a base station.

FIG. 2 shows a principle flowchart of an example for a method according to certain embodiments of the present invention.

In Step S21, a negative acknowledgement signaling from a terminal is received upon transmission comprising a first and a second codeword to the terminal.

In Step S22, a temporary codeword for the codeword not associated with the negative acknowledgement signaling is provided.

In Step S23, a transmission comprising a re-transmission of the codeword associated with the negative acknowledgement signaling and the temporary codeword is caused.

Figure 3:
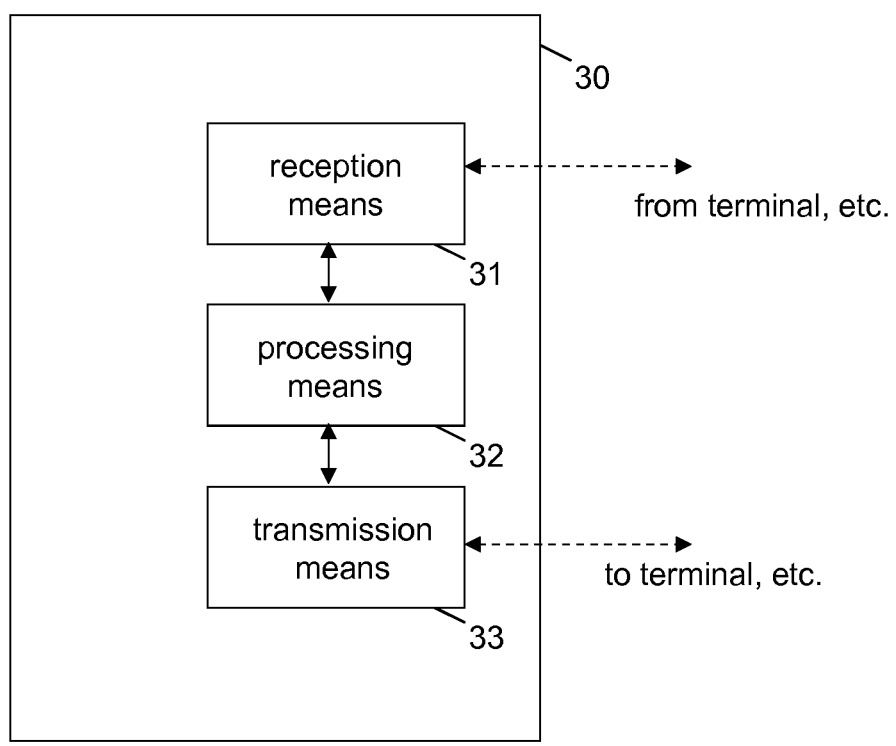
FIG. 3 shows a principle configuration of an example for an apparatus according to certain embodiments of the present invention.

FIG. 3 shows a principle configuration of an example for an apparatus according to certain embodiments of the present invention. The apparatus 30 comprises reception means 31 adapted to receive a negative acknowledgement signaling from a terminal upon transmission comprising a first and a second codeword to the terminal, processing means 32 adapted to provide a temporary codeword for the codeword not associated with the negative acknowledgement signaling, and transmission means 33 adapted to cause a transmission comprising a re-transmission of the codeword associated with the negative acknowledgement signaling and the temporary codeword.

Figure 4:
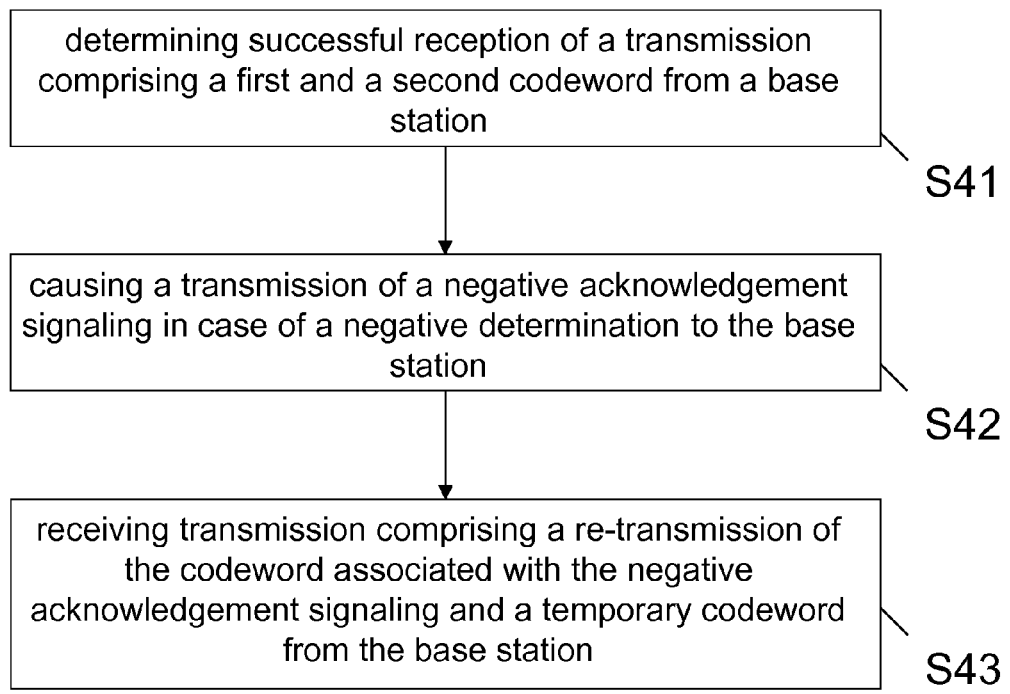
FIG. 4 shows a principle flowchart of an example for a method according to certain embodiments of the present invention, which may be implemented in a terminal, such as a user equipment UE.

FIG. 4 shows a principle flowchart of an example for a method according to certain embodiments of the present invention.

In Step S41, successful reception of a transmission comprising a first and a second codeword from a base station is determined.

In Step S42, a transmission of a negative acknowledgement signaling in case of a negative determination to the base station is caused.

In Step S43, a transmission comprising a re-transmission of the codeword associated with the negative acknowledgement signaling and a temporary codeword from the base station is caused.

Figure 5:
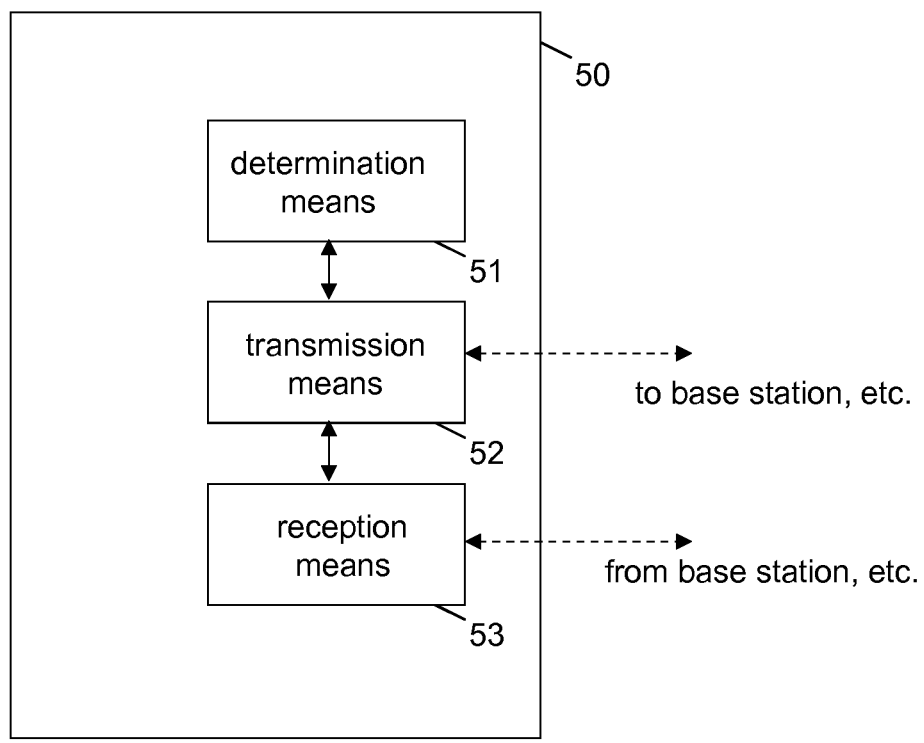
FIG. 5 shows a principle configuration of an example for an apparatus according to certain embodiments of the present invention.

FIG. 5 shows a principle configuration of an example for an apparatus according to certain embodiments of the present invention. The apparatus 50 comprises a determination means 51 adapted to determine successful reception of a transmission comprising a first and a second codeword from a base station, transmission means 52 adapted to cause a transmission of a negative acknowledgement signaling in case of a negative determination to the base station, and reception means 53 adapted to receive a transmission comprising a re-transmission of the codeword associated with the negative acknowledgement signaling and a temporary codeword from the base station.

As already indicated above, according to the specification of 3GPP TSG RAN WG1 #69 v0.2.0, in case of re-transmissions the number of layers (and TBs) per CW and the order of code shall be maintained.

However, the following scenarios may occur:

A first case in which the agreements above lead to a not well defined scenario is if one of two code words (CW) fails, and the buffer for the UE is empty after this transmission.

In this case, the node B is obliged to keep a transmission with two CWs (rank 2 to 4) but has actually no data do transmit on the second CW, and thus would not be able to retransmit the CW pending a re-transmission.

A second case occurs when the UE channel condition becomes rapidly worse while in a re-transmission of a CW that was transmitted with a rank higher than rank 1. In such a scenario it is possible that the second CW which is not in re-transmission fails while the other CW is being retransmitted and starts a re-transmission cycle of its own. After the re-transmission of the first CW is finished (successfully or not), the UE would have to stay in rank 4 and start yet another CW until the second re-transmission is fished. This process would potentially continue and cause severe performance loss for the affected UE.

According to certain embodiments of the present invention, the following 3 options may be considered:
1. Proprietary termination of the pending re-transmission(s), and either transmitting that data as a new transmission, or let RLC re-transmission protocol take care of the lost data
2. Fill the successful codeword with dummy data
3. Keep the successful codeword empty and potentially use double power for the re-transmission In option 1, the node B would simply fail the affected transport blocks (up to 2 in one CW) and the corresponding HARQ process instead of retransmitting the code word. This would allow for a complete new transmission which can use any rank. This approach would invalidate all soft information stored in the UE and result in a small overall performance loss. However, the added Node B L1 and L2 coordination complexity is seen undesirable if it can be avoided.

To enable option 1, the data that is in the HARQ transmission buffer would also need to be kept in the medium access control MAC-ehs buffer until the HARQ terminates successfully in order to be able to terminate the HARQ process before successful TB delivery, reselect the MCS and transmit the same L2 information as a new HARQ transmission. This leads to an undesired control loop between L1 and L2, and adds complexity to the L2 data buffer management.

As regards option 2, considering first case scenario described above, the NB would have to make a decision on what to transmit on the codeword not in re-transmission. Since the buffer for this particular UE is empty and a dual codeword transmission is forced by the restriction set for the re-transmission, the node B would have to transmit dummy data in the second codeword. This may be suboptimal since energy is used to transmit useless data which generates on top of this interference. Particularly for the codeword which is retransmitted is sensitive to the unnecessary interference.

A further solution which avoids interference is option 3. Not transmitting anything in the second CW would not only reduce the interference but would allow at the same time to double (or even triple for some rank 3 re-transmissions) the transmit power of the re-transmission. This would increase the probability of a successful re-transmission and allow for quickly leaving the state of rank limitation if needed. To allow for a proper decoding and power estimation of the retransmitted codeword and skipping the empty codeword, the UE needs to be informed that one of the code words is empty.

Hence, according to certain embodiments of the present invention, an empty code word may be transmitted with a retransmitted code word when two CWs are being sent.

In the following, signaling options for empty code words are described.

As example, an indication of the empty code words could be signaled via HS-SCCH. One option is to reserve a special TFRI/modulation combination for this purpose, i.e. if
  The HS-SCCH indicates rank >1
  One of the two CWs is an initial transmission
  Another one of the two CWs is a re-transmission
a specific TFRI of the initial transmission CW is used, then only the CW carrying the needed re-transmission is actually transmitted and the other CW contains no data and no energy.

As an alternative an invalid signaling could be used to indicate an empty code word, i.e. if
  The HS-SCCH indicates rank >1
  Both code words are re-transmissions
  One of the two CWs was already received correctly, and the unnecessary re-transmission of this CW has a mismatching TB size,
then only the CW carrying the needed re-transmission is actually transmitted and the other CW contains no data and no energy.

Option 2 has the advantage that the full set of TFRIs can be used for new transmissions of successfully transmitted code words.

Therefore, according to certain embodiments of the present invention, a new signaling scheme 2 (alternative) may be introduced to indicate empty codeword to the UE allowing for the Node B to fall back to a single CW re-transmission.

As a background, according to 3GPP Rel-8 TS25.212 subclause 4.6B.1, the 2×2 MIMO HS-SCCH has the following bits:
Part 1:
  Code set info (7 bits), notably the # of codes is common for both code words
  Modulation and rank (3 bits,)
  Precoding information (2 bits)
Part 2 with Two Code Words (Rank 2):
  TFRI1 for TB1 (=CW1) (6 bits)
  TFRI2 for TB2 (=CW2) (6 bits)
  HARQ process information (4 bits)
  Redundancy and constellation version for TB1 (=CW1) (2 bits), a sequence of '00' means first transmission, others mean re-transmission
  Redundancy and constellation version for TB2 (=CW2) (2 bits), a sequence of '00' means first transmission, others mean re-transmission For 4×4 MIMO case the TFRI1 and TFRI2 would both be present for rank 2, 3 and 4 transmissions, but depending on the rank the corresponding CW could contain 1 or 2 transport blocks TB of the same size. For example for rank 2 the mapping is as with 2×2 MIMO above, and for rank 4 the TFRI1 tells the sizes (together with modulation and # of codes) of TB1 and TB2, which make the CW1, and the TFRI2 tells the sizes of TB3 and TB4, which make the CW2.

Therefore, according to certain embodiments of the present invention,
If
  The transmission rank is indicated to be >1 (two code words indicated by the modulation and rank field)
  One of the two code words' 'redundancy and constellation version' indicates a new transmission
  Another one of the two code words' 'redundancy and constellation version' indicates a re-transmission
  The modulation of the new transmission is set to a predetermined value
  The TFRI of the new transmission is set to a predetermined value Then
  Only the retransmitted code word is actually sent and the new transmission is considered to contain no data and no energy.
Or alternatively:
If
  The transmission rank is indicated to be >1 (two code words indicated by the modulation and rank field)
  Both code words' 'redundancy and constellation version' indicate a re-transmission
  One of the two code words being retransmitted was already received correctly (no need for the re-Tx)
  The TB size indicated for this code word does not match the TB size of the already successfully received packet
  The modulation of this code words is set to a predetermined value Then
    Only the retransmitted code word of the not yet correctly received transmission is actually sent and the re-transmission of the already correctly received CW is considered to contain no data and no energy.

That is, according to certain embodiments of the present invention, a one zero-power code word for a nominally two-code word transmission is indicated in order to facilitate a one CW re-transmission after a dual CW transmission has one CW successfully received, the other CW was not successfully received and dual CW transmission cannot be continued.

As example, the two cases for the case "dual CW transmission cannot be continued" are:
  1. End-of-data, the Node B buffer is empty and there is no new data to put in parallel to the CW that is being retransmitted
  2. Need to reduce rank due to poorer channel conditions leading to the Node B not wanting to put new data in parallel to the CW that is being retransmitted due to efficiency.

According to certain embodiments of the present invention, the NodeB may detect the deadlock, i.e., the case that the transmission is stuck due to the high rank e.g. based on the UE channel quality indicator CQI reports, which indicate that the lower rank is preferred (basically lower rank leading to higher throughput due to link conditions). Furthermore, the Node B may decide what the transmission rank should be, but due to the lock-in it is not able to transmit with the lower rank, but is forced to stick with the rank used in the previous transmission attempt of the failed CW.

In the foregoing exemplary description of the apparatus, only the units that are relevant for understanding the principles of the invention have been described using functional blocks. The apparatuses may comprise further units that are necessary for its respective function. However, a description of these units is omitted in this specification. The arrangement of the functional blocks of the apparatuses is not construed to limit the invention, and the functions may be performed by one block or further split into sub-blocks.

According to exemplarily embodiments of the present invention, a system may comprise any conceivable combination of the thus depicted devices/apparatuses and other network elements, which are arranged to cooperate as described above.

Embodiments of the present invention may be implemented in software, hardware, application logic or a combination of software, hardware and application logic. The software, application logic and/or hardware generally, but not exclusively, may reside on the devices' modem module. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The present invention relates in particular but without limitation to mobile communications, for example to environments under HSDPA, UMTS, LTE, WCDMA, WIMAX and WLAN and can advantageously be implemented in controllers, base stations, user equipments or smart phones, or personal computers connectable to such networks. That is, it can be implemented as/in chipsets to connected devices, and/or modems thereof.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following meanings for the abbreviations used in this specification apply:
3GPP 3rd Generation Partnership Project
Ack/Nack: Acknowledgement/Negative acknowledgement
CW: codeword
HARQ: Hybrid Automatic Repeat Request (a re-transmission scheme on the physical layer)
HS-SCCH: Highspeed Shared Control Channel
ID: identifier
MIMO: Multiple Input Multiple Output
NB: Node B (base station in 3G Wideband-CDMA)
TB: transport block
TFRI: Transport Format Resource Indicator
TTI: transmission time interval

What is claimed is:

1. A base station comprising:
at least one processor and at least one memory storing software, wherein the at least one processor and the at least one memory with the software are configured to cause the base station to at least:
receive a negative acknowledgement signaling from a terminal upon a first transmission comprising a first and a second codeword to the terminal, said first transmission defining a rank;
provide a temporary codeword for whichever of the first and second codewords that is not associated with the negative acknowledgement signaling; and
send to the terminal a second transmission comprising a retransmission of whichever of the first and second codewords that is associated with the negative acknowledgement signaling and the temporary codeword such that the second transmission defines a same rank as the first transmission, said retransmitted codeword that is associated with the negative acknowledgement signaling being transmitted with a higher transmit power than the temporary codeword;
wherein the temporary codeword is an empty codeword which cannot be used for performing an associated hybrid automatic repeat request HARQ process.

2. The base station according to claim 1, wherein signaling for the usage of the temporary codeword is carried out via transport format resource indicator transmitted over highspeed shared control channel.

3. The base station according to claim 1, wherein a modulation indicator of the temporary codeword is set to a predetermined value.

4. The base station according to claim 1, wherein a transport format resource indicator of the temporary codeword is set to a predetermined value.

5. The base station according to claim 1, wherein the at least one processor and the at least one memory with the software are configured to cause the base station further to add information indicating a transmitted codeword being an initial transmission or re-transmission may be set to a predetermined value in order to indicate that the transmitted codeword is a temporary codeword.

6. A method, comprising:
receiving a negative acknowledgement signaling from a terminal upon a first transmission comprising a first and a second codeword to the terminal, said first transmission defining a rank;
providing a temporary codeword for whichever of the first and second codewords that is not associated with the negative acknowledgement signaling; and
sending to the terminal a second transmission comprising a re-transmission of whichever of the first and second codewords that is associated with the negative acknowledgement signaling and the temporary codeword such that the second transmission defines a same rank as the first transmission, said re-transmitted codeword that is associated with the negative acknowledgement signaling being transmitted with a higher transmit power than the temporary codeword;
wherein the temporary codeword is an empty codeword which cannot be used for performing an associated hybrid automatic repeat request HARQ process.

7. A terminal comprising:
at least one processor and at least one memory storing software, wherein the at least one processor and the at least one memory with the software are configured to cause the base station to at least:
determine successful reception of codewords of a first transmission comprising a first and a second codeword from a base station;
transmit a negative acknowledgement signaling in case of a negative determination to the base station; and in reply
receive a second transmission comprising a retransmission of whichever of the first and second codewords that is associated with the negative acknowledgement signaling and a temporary codeword from the base station such that the second transmission defines a same rank as the first transmission, said retransmitted codeword that is associated with the negative acknowledgement signaling being received with a higher transmit power than the temporary codeword;
wherein the temporary codeword is an empty codeword which cannot be used for performing an associated hybrid automatic repeat request HARQ process.

8. The terminal according to claim 7, wherein signaling for the usage of the temporary codeword is carried out via transport format resource indicator transmitted over high-speed shared control channel.

9. A method, comprising:
determining successful reception of a first transmission comprising a first and a second codeword from a base station;
transmitting a negative acknowledgement signaling in case of a negative determination to the base station; and in reply
receiving a second transmission comprising a re-transmission of whichever of the first and second codewords that is associated with the negative acknowledgement signaling and a temporary codeword from the base station such that the second transmission defines a same rank as the first transmission, said re-transmitted codeword that is associated with the negative acknowledgement signaling being received with a higher transmit power than the temporary codeword;
wherein the temporary codeword is an empty codeword which cannot be used for performing an associated hybrid automatic repeat request HARQ process.

10. A non-transitory computer readable memory tangibly storing software that is executable by a processing device, the software comprising software code portions for performing the method according to claim 6 when the stored software is run on the processing device.

11. A non-transitory computer readable memory tangibly storing software that is executable by a processing device, the software comprising software code portions for performing the method according to claim 9 when the stored software is run on the processing device.

* * * * *